(12) United States Patent
Statnic et al.

(10) Patent No.: US 6,323,600 B1
(45) Date of Patent: Nov. 27, 2001

(54) PROCESS FOR GENERATING VOLTAGE PULSE SEQUENCES AND CIRCUIT ASSEMBLY THEREFOR

(75) Inventors: Eugen Statnic; Alwin Veser; Bernhard Ertl, all of Munich (DE)

(73) Assignee: Patent-Treuhand-Gesellschaft fuer elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/254,938

(22) PCT Filed: Jun. 24, 1998

(86) PCT No.: PCT/DE98/01723

§ 371 Date: Mar. 17, 1999

§ 102(e) Date: Mar. 17, 1999

(87) PCT Pub. No.: WO99/05892

PCT Pub. Date: Feb. 4, 1999

(30) Foreign Application Priority Data

Jul. 22, 1997 (DE) .............................................. 197 31 275

(51) Int. Cl.$^7$ .................................................. H05B 37/02
(52) U.S. Cl. ..................... 315/209 R; 315/219; 315/291; 315/DIG. 7; 315/276
(58) Field of Search ............................. 315/209 R, 219, 315/224, 225, 241 R, 243, 291, 246, 257, 274, 276, DIG. 7

(56) References Cited

U.S. PATENT DOCUMENTS

| | | | |
|---|---|---|---|
| 4,573,184 | * | 2/1986 | Tanaka et al. ........................ 378/110 |
| 4,720,668 | * | 1/1988 | Lee et al. ............................. 323/271 |
| 5,065,072 | * | 11/1991 | Albou et al. ........................... 315/82 |
| 5,144,204 | * | 9/1992 | Nerone et al. .................... 315/209 R |
| 5,343,125 | * | 8/1994 | Bernitz et al. ........................ 315/245 |
| 5,446,346 | * | 8/1995 | Nilssen ............................. 315/209 R |
| 5,561,349 | * | 10/1996 | Hartai ............................... 315/209 R |
| 5,623,187 | * | 4/1997 | Caldeira et al. ...................... 315/307 |
| 5,684,683 | * | 11/1997 | Divan et al. ............................. 33/65 |
| 5,798,616 | * | 8/1998 | Takehara et al. ..................... 315/247 |
| 5,831,394 | * | 11/1998 | Huber et al. ......................... 315/224 |
| 5,977,722 | * | 11/1999 | Yokokawa et al. ................... 315/207 |
| 5,982,645 | * | 11/1999 | Levran et al. .......................... 363/37 |
| 6,008,591 | * | 12/1999 | Huber et al. ......................... 315/219 |

FOREIGN PATENT DOCUMENTS

| | | |
|---|---|---|
| 19548003 | 6/1997 | (DE) . |
| 0302748 | 2/1989 | (EP) . |
| 0449667 | 10/1991 | (EP) . |
| 9423442 | 10/1994 | (WO) . |

* cited by examiner

*Primary Examiner*—Don Wong
*Assistant Examiner*—Tuyet T. Vo
(74) *Attorney, Agent, or Firm*—Carlo S. Bessone

(57) ABSTRACT

An electrical circuit arrangement for producing pulsed-voltage sequences for the operation of discharges which are impeded dielectrically comprises a series circuit formed from a tuned circuit inductance (TR2-A) and a controlled switch (T1), a pulse generator (OS) which drives the switch (T1), an electrical valve (D1) which is connected in parallel with the switch (T1), a tuned circuit capacitance (C2) which is likewise connected in parallel with the switch (T1), a means (TR2-B, a", b") for coupling a lamp (La1) to at least one electrode which is impeded dielectrically, and, optionally, a buffer and feedback capacitor (C1) which is connected in parallel with the series circuit formed by the tuned circuit inductance (TR2-A) and the switch (T1). The means for coupling a lamp comprises in particular two connections (a", b") and the secondary winding (TR2-B) of an autotransformer (TR2), which is connected between a first pole of the switch (T1) and the corresponding connection (a"), the primary winding (TR2-A) of the autotransformer (TR2) acting as the tuned circuit inductance. The second connection (b') is connected to the second pole of the switch (T1). In operation, the switch (T1) opens and closes alternately in time with the drive signal of the pulse generator (OS), as a result of which a sequence of voltage pulses, which are separated by pauses, is produced at the electrodes, which are impeded dielectrically, of a lamp (La1) which is connected to the connections (a", b").

20 Claims, 4 Drawing Sheets

PROCESS FOR GENERATING VOLTAGE PULSE SEQUENCES AND CIRCUIT ASSEMBLY THEREFOR

TECHNICAL FIELD

The invention relates to an electrical circuit arrangement for producing pulsed-voltage sequences for the operation of discharge lamps. The invention further relates to the method in accordance with which the circuit arrangement produces the pulsed-voltage sequences.

To be more precise, the circuit arrangement according to the invention is used to operate discharge lamps or radiators in which at least the electrodes of one polarity are impeded dielectrically, by means of unipolar or at least substantially unipolar voltage pulses, such as those described in WO 94/23442, for example. This method of operation uses a sequence, which is in principle unlimited, of voltage pulses which are separated from one another by pauses. The critical factors for the efficiency of the wanted radiation production are, essentially, the pulse shape as well as the time durations of the pulse and pause times. Typical duty ratios are in the range between about 1:5 to 1:10. The peak value of the high-voltage pulses depends on the design of the respective lamp, for example the number of electrodes, the flashover distance and the nature and thickness of the dielectric, and is typically between 1 kV and 5 kV. The pulse repetition frequency is also dependent on the geometry of the lamp and is in the range from about 25 kHz to about 80 kHz. Conventional methods of operation for such lamps in contrast use sinusoidal AC voltages.

In contrast to conventional discharges, as are normally used for discharge lamps, discharges which are impeded dielectrically have a dielectric which is arranged between the interior of the discharge space and the electrode or electrodes of one polarity (impeded dielectrically on one side) or else all the electrodes, that is to say the electrodes of both polarities (impeded dielectrically on both sides). Such electrodes are also called electrodes which are impeded dielectrically. The charge carrier transportation from an electrode which is impeded dielectrically to the ionized gas in the discharge path thus takes place by means of a displacement current rather than by means of a conduction current. This results in a capacitive component in the electrical equivalent circuit for such a discharge. In consequence, the circuit arrangement has to be suitable for injecting the energy capacitively into the lamp.

PRIOR ART

DE 195 48 003 A1 (Huber et al., U.S. Pat No. 5,581,394) discloses an electrical circuit arrangement for producing pulsed-voltage sequences, in particular for the operation of discharges which are impeded dielectrically. This circuit arrangement has a charge circuit which is fed from an input voltage and has a charge capacitor, a discharge and pulse circuit having a fast controllable switch which is connected to a pulsed drive circuit, and a pulse transformer with a load connected to it, as well as a feedback circuit with a feedback electrical valve and a buffer capacitor which is connected in parallel with the input of the charge circuit. During the phases when the switch is switched on, the electrical energy stored in the charge capacitor is always transmitted to the load via the pulse transformer. The oscillating energy returning from the load and the pulse transformer passes through the feedback circuit, is fed into the feedback point, and is absorbed by the buffer capacitor. Thus, during the reverse oscillation phases, the potential of the secondary winding is clamped to the potential of the input voltage. In addition, the energy fed back is in this way also used for the charging phase of the charge capacitor. The disadvantages of this solution are the high pulsed load on the pulse transformer and on the switch, the relatively poor efficiency, as well as the not inconsiderable component complexity. In addition, the specific design of the pulse transformer has a critical effect on the operation of the circuit. Furthermore, the optimum design of the pulse transformer can be determined only by experiment.

DESCRIPTION OF THE INVENTION

The object of the present invention is to provide a circuit arrangement with whose aid largely unipolar pulsed-voltage sequences can be produced, with low circuit losses. In addition, it is intended to be possible to produce pulsed-voltage sequences with pulse shapes that are as smooth as possible on loads which act in a predominantly capacitive manner. A further aspect of the invention is to provide a relatively simple circuit with as few components as possible.

A further object of the invention is to provide a method of producing the above mentioned pulsed-voltage sequences.

The basic idea of the invention is explained in the following text with reference to a simplified block diagram in FIG. 1. Fed from an energy supply source 1, an inductive energy reservoir 3 is first of all cyclically charged up during the switched-on phase of a controllable switch 2. After the charging-up phase, that is to say as soon as the switch 2 switches off, the magnetic energy stored in the inductive energy reservoir 3 is transmitted to a capacitive energy reservoir 4. In consequence, a first voltage half-cycle of a roughly sinusoidal oscillation is produced on the inductive energy reservoir 3, while a similar voltage half-cycle, but in antiphase, is produced on the capacitive energy reservoir 4. This first voltage half-cycle is used as a voltage pulse for the lamp 5—which is coupled either to the inductive energy reservoir 3 or to the capacitive energy reservoir 4. After this, the energy is fed back from the capacitive energy reservoir 4, via the inductive energy reservoir 3, into the energy supply source 1, which advantageously contains an additional feedback reservoir (not illustrated). In this case, the voltage on the capacitive energy reservoir 4 is clamped to the voltage which is dropped across the open electrical valve 6. In consequence, during this process, the voltage on the inductive energy reservoir 3 is equal to the supply voltage. This process is repeated cyclically after a time which can be predetermined. The timing is controlled via a signal transmitter 7 which is connected to the controllable switch 2.

In this way, a sequence of essentially half-sinusoidal voltage pulses in the same phase is produced at the lamp electrodes, the individual voltage pulses being separated from one another by pauses, that is to say times during which the voltage at the electrodes is largely constant and is considerably less than the peak value of the voltage pulses, preferably being close to zero.

This idea of the invention is in essence achieved by the series circuit formed by a controllable switch and an inductance which is used, inter alia, as an inductive energy reservoir and is also referred to in the following text, for short, as a tuned circuit inductance, the switch having connected in parallel with it the electrical valve and a capacitance which is used as the capacitive energy reservoir—also referred to as a tuned circuit capacitance in the following text, for short.

The width of the voltage pulses, inter alia, can be influenced by the specific values of the tuned circuit inductance and the tuned circuit capacitance. Typical values for the operation of radiation sources of the type mentioned in the introduction are in the range between about 500 μH and 10 μH for the tuned circuit inductance, and about 100 pF and 1 μF for the tuned circuit capacitance.

A capacitor may be used, for example, as the tuned circuit capacitance, or alternatively the actual intrinsic capacitance of a discharge arrangement which is provided with electrodes which are impeded dielectrically. If the switch is provided by a controllable semiconductor switch, for example by a bipolar transistor, IGBT (Insulated Gate Bipolar Transistor) or MOSFET (Metal Oxide Semiconductor Field Effect Transistor), the depletion layer capacitance of the semiconductor switch can also be used as the tuned circuit capacitance, since the tuned circuit capacitance—as will be shown later—is significant to the operation of the circuit arrangement only during the phase when the switch is switched off. In fact, an additional capacitor offers the advantage of in this way being able to influence the width of the voltage pulse. The value of an additional capacitor is thus chosen depending on the desired pulse width. A capacitor connected in parallel with the input terminals of the arrangement may be used as a feedback reservoir. The feedback reservoir may also be a component of an energy supply which can be fed back. In the latter case, it is possible to dispense with a specific feedback reservoir in the input of the circuit arrangement.

In the simplest case, the discharge arrangement or lamp is coupled directly to the capacitor or to the controllable semiconductor switch. To do this, lamp supply leads are connected to the connections of the capacitor or of the semiconductor switch. This simple solution is particularly suitable for lamps having a relatively low maximum pulsed voltage (pulsed voltages of less than about 1500 V), since, in this case, the maximum voltage across the semiconductor switch when it is switched off limits the maximum pulsed voltage that can be produced.

In a preferred variant for lamps having a higher maximum pulsed voltage, the secondary winding of an autotransformer is connected in one of the lamp supply leads. The tuned circuit inductance, which is used as an inductive energy reservoir, is in this case provided by the primary winding of this autotransformer.

Finally, in a further variant, the lamp is coupled via a high-voltage transformer. The primary winding of the high-voltage transformer acts as the inductive energy reservoir. The lamp supply leads are in this case connected to the connections of the secondary winding. Higher maximum pulsed voltages can likewise be produced with this variant. In fact, this solution is more complex, and therefore also more expensive than the abovementioned solution. The disadvantages in comparison with the autotransformer variant are also the higher losses and the less favourable turns ratio. In order, for example, to triple the voltage on the lamp supply leads in comparison with the voltage on the primary winding, a transformation ratio of three is likewise required. In contrast, a transformation ratio of two is sufficient for the autotransformer variant, owing to the electrical circuitry of the primary and secondary windings, and the fact that they are wound in the same sense.

The circuit arrangement according to the invention is also particularly suitable for operation at low voltages, for example for battery operation when used in a motor vehicle or the like. For operation at mains voltage, the circuit arrangement has a voltage-matching converter connected upstream of it, by means of which it is also possible, at the same time, to ensure that the current drawn from the mains is sinusoidal.

In addition, protection is claimed for a radiation system which comprises the abovementioned novel pulsed-voltage source and a discharge lamp or a discharge radiator of the type mentioned initially.

DESCRIPTION OF THE DRAWINGS

The invention will be explained in more detail in the following text with reference to a plurality of exemplary embodiments. In the figures:

FIG. 2 shows a simplified illustration of a preferred circuit arrangement for lamps with a relatively low maximum required pulsed voltage. Since, in this circuit arrangement, the lamp is connected in parallel with the semiconductor switch, the maximum pulsed voltage which can be produced is, namely, limited by the maximum voltage across the semiconductor switch when it is switched off.

Figure 1:
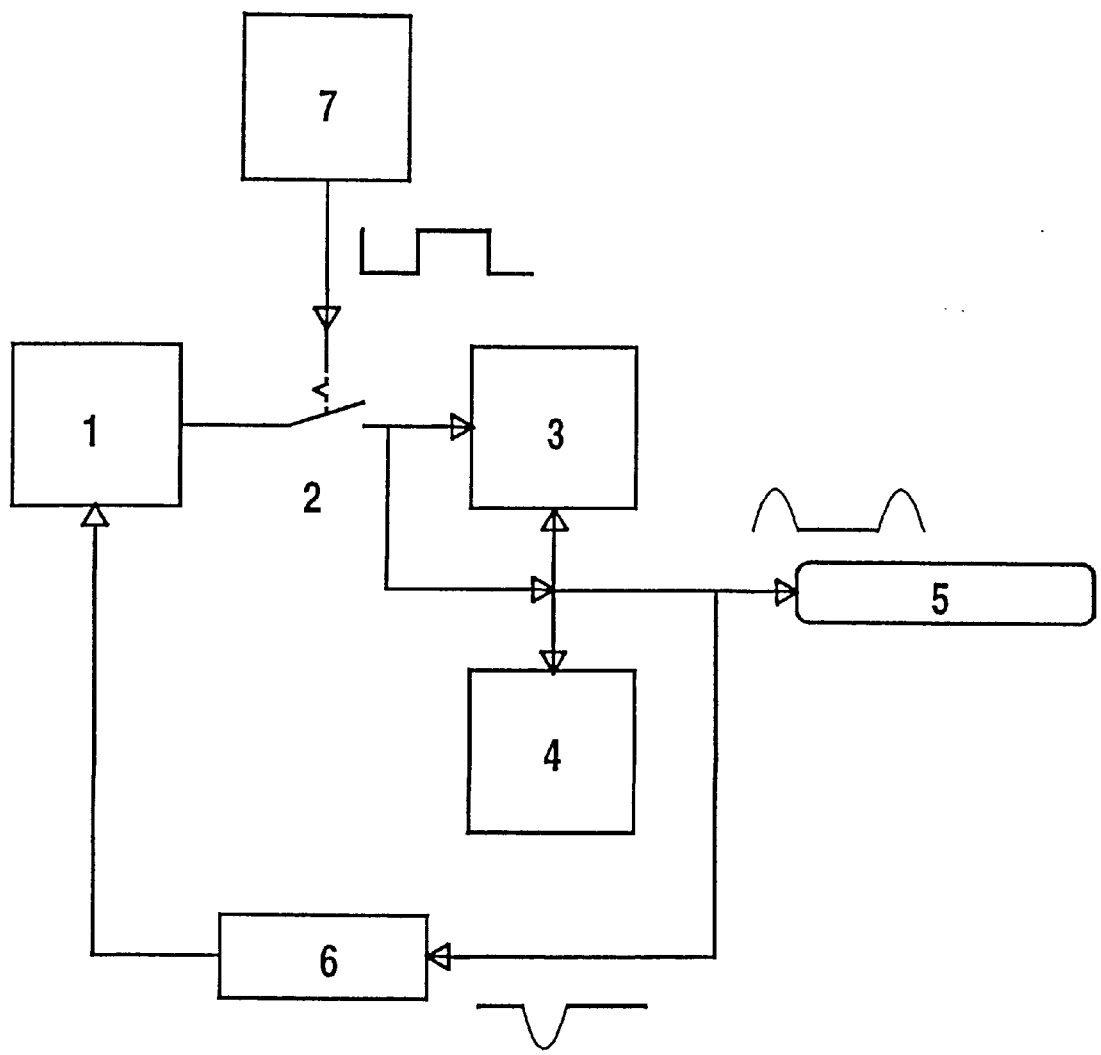
FIG. 1 shows a block diagram to illustrate the principle of the invention.

The circuit arrangement comprises a buffer capacitor C1 which is supplied by a DC voltage $+U_o$, for example the output voltage of a rectifier circuit or of a battery, and which is in addition also used as a feedback reservoir, a series circuit formed from the tuned circuit inductance L1 and a bipolar transistor T1 with a freewheeling diode D1, which series circuit is connected to the negative lead of the buffer capacitor C1, as well as a tuned circuit capacitor C2 which is connected in parallel with the transistor T1. A lamp La1 with electrodes which are impeded dielectrically is connected in parallel with the tuned circuit capacitor C2, by means of the connections a,b.

The transistor T1 is driven by an asymmetric square-wave oscillator OS, for example a pulse generator IC which is known per se. As long as the transistor T1 is switched on, a linearly rising current flows through it and through the tuned circuit inductance L1. At the end of the switched-on time $t_1$, the current reaches the peak value $I_s$. At this time, the magnetic energy stored in the tuned circuit inductance is:

$$W_m = 0.5 \cdot L_1 \cdot I_s^2 \qquad (1)$$

At the time $t=t_1$, the transistor T1 is switched off, and a free sinusoidal oscillation now takes place whose period is $$T_s = 2 \cdot \pi \cdot \sqrt{L_1 \cdot C_2} \qquad (2)$$

In the process, the magnetic energy $W_m$ charges the tuned circuit capacitor C2 to a voltage $U_{C2}$, which results from the energy $W_m$ in accordance with:

$$W_m = 0.5 \cdot L_1 \cdot I_s^2 = 0.5 \cdot C_2 \cdot U_{c2}^2, \qquad (3)$$

that is to say $$U_{c2} = \sqrt{\frac{2 \cdot W_m}{C_2}}. \quad (4)$$

In this assessment for the series tuned circuit C1, L1, C2, the capacitance of the buffer capacitor C1, typically a few $\mu F$, has become negligible in comparison with the capacitance of the tuned circuit capacitor C2, typically several 100 pF.

The positive half-cycle of the sinusoidal oscillation at the tuned circuit capacitor C2 and having the amplitude $U_{C2}$ is in parallel with the transistor T1 and reverse-biases the back-to-back connected diode D1. The negative half-cycle is clamped by the diode D1, and the tuned circuit inductance L1 feeds energy back into the feedback capacitor C1. In this way, a roughly half-sinusoidal pulsed voltage $U_i$ is produced, with an amplitude which is much higher than the supply voltage $U_o$. In this case, the width of the voltage pulse is $$t_i = \pi \cdot \sqrt{L1 \cdot C2}. \quad (5)$$

Figure 2:
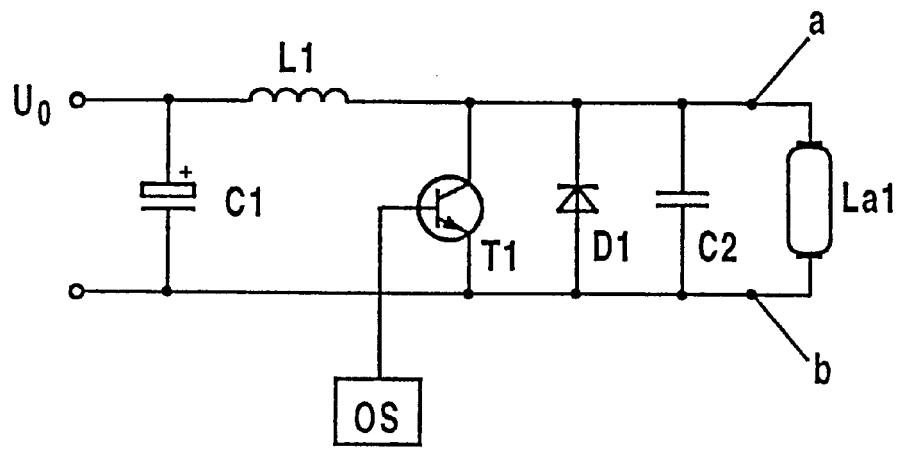
FIG. 2 shows a first cost-effective exemplary embodiment for relatively low pulsed voltages.
Figure 3:
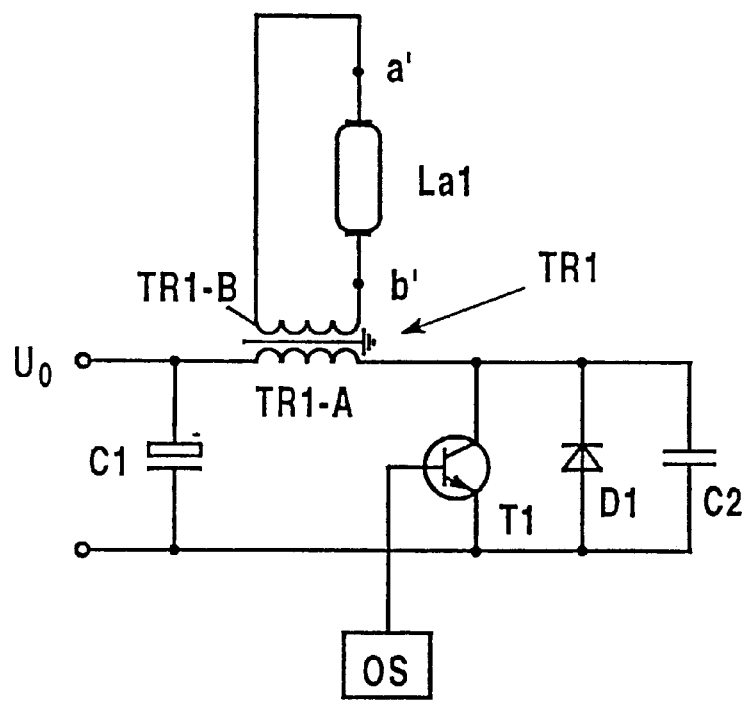
FIG. 3 shows a further exemplary embodiment having a high-voltage transformer for higher pulsed voltages.

FIG. 3 shows a variant of the circuit from FIG. 2, which is also suitable for lamps with higher maximum pulsed voltages. Equivalent components are given the same reference symbols. In this case, the tuned circuit inductance L1 from FIG. 2 is replaced by a transformer TR1. The lamp La1 is connected by means of the connections a', b' to the secondary winding TR1-B of the transformer TR1. In consequence, it is possible to operate even lamps whose maximum pulsed voltage is considerably above the maximum voltage across the semiconductor switch T1 when it is switched off.

As in the case of the circuit in FIG. 2, the transistor T1 is driven by an asymmetric square-wave oscillator OS. When the transistor T1 is switched on, a linearly rising current flows through the primary winding TR1-A of the transformer TR1 with the inductance $L_P$, and through the transistor T1. At the end of the switched-on time t, the current reaches the peak value $I_s$. At this time, the energy stored in the primary inductance $L_P$ is $$W_m = 0.5 \cdot L_P \cdot I_s^2 \quad (6)$$

At the time $t=t_1$, the transistor T1 is switched off, and this is followed by a free sinusoidal oscillation with the period $$T_s = 2 \cdot \pi \cdot \sqrt{L_P \cdot C_2}. \quad (7)$$

At the same time, the magnetic energy $W_m$ charges the tuned circuit capacitor C2 to a voltage $U_{C2}$ which corresponds to the energy $W_m$:

$$W_m = 0.5 \cdot L_P \cdot I_s^2 = 0.5 \cdot C_2 \cdot U_{C2}^2, \quad (8)$$

that is to say $$U_{c2} = \sqrt{\frac{2 \cdot W_m}{C_2}}. \quad (9)$$

The voltage on the primary winding TR1-A of the transformer TR1 is thus $$U_{LP} = U_{C2} - U_o. \quad (10)$$

This voltage $U_{LP}$ is transformed in accordance with the transformation ratio $$\ddot{u} = \frac{w_s}{w_p}$$

of the transformer TR1 onto the secondary winding TR1-B and, in consequence, is applied to the lamp La1 connected there. In equation (12), $w_S$ is the number of turns on the secondary winding and $w_P$ is the number of turns on the primary winding. The voltage $U_{LS}$ on the secondary winding TR1-B of the transformer TR1 is thus $$U_{LS} = U_{LP} \cdot \ddot{u}. \quad (12)$$

The positive half-cycle of the sinusoidal oscillation on the tuned circuit capacitor C2 having the amplitude $U_{C2}$ is in parallel with the transistor T1, and thus switches off the back-to-back connected diode D1. The negative half-cycle is, in contrast, clamped by the diode D1, while energy is fed back into the feedback capacitor C1 via the primary inductance $L_P$ of the transformer TR1.

During this feedback process, the voltage on the primary inductance $L_P$ is $$U_{LP} = U_o, \quad (13)$$

which is likewise transformed in accordance with the transformation ratio ü of the transformer TR1 onto the secondary winding TR1-B. In consequence, during the pulse pauses, that is to say during the times between the pulses, there is an offset voltage on the lamp La1. In order to prevent any adverse effect on lamp operation, the circuit is designed such that the offset voltage is very much less than the pulsed voltage.

Figure 4:
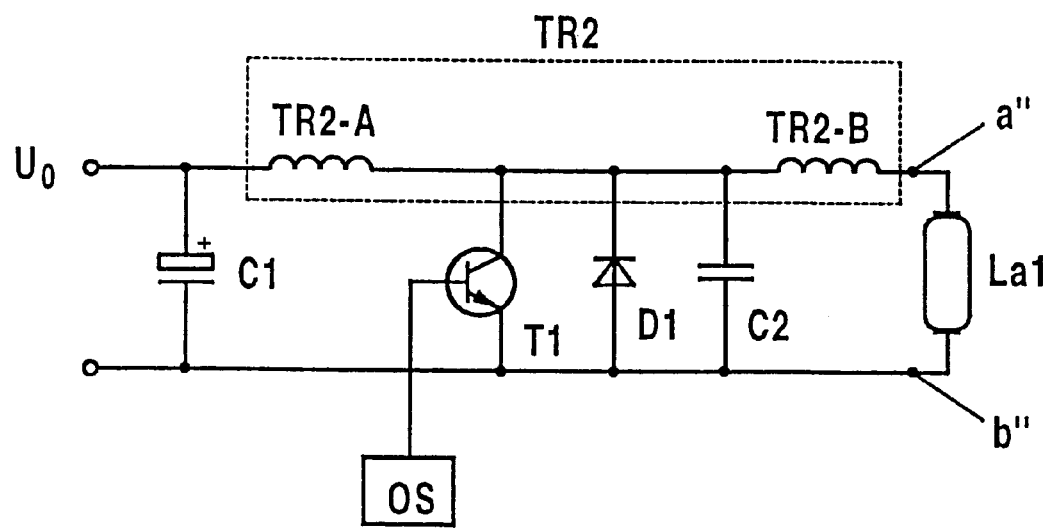
FIG. 4 shows yet another exemplary embodiment having an autotransformer for higher pulsed voltages.

FIG. 4 schematically illustrates a preferred variant of the circuit from FIG. 3, which is likewise suitable for lamps with higher maximum pulsed voltages.

In this variant, the transformer TR1 is replaced by an autotransformer TR2 whose primary winding TR2-A is used as the inductive energy reservoir, and whose secondary winding TR2-B is connected between the tuned circuit capacitor C2 and the corresponding connection a" of the lamp La1. In consequence, the lamp La1 is connected by means of the connections a",b" in parallel with the series circuit formed by the secondary winding TR2-B and the tuned circuit capacitor C2. One advantage of this solution that results from this over the solution in FIG. 3 is the more favourable turns ratio. For example, in order to triple the voltage from the lamp supply leads in comparison with the voltage on the primary winding TR2-A, a transformation ratio of just two is sufficient for the autotransformer variant TR2, owing to the electrical circuitry of the primary TR2-A and secondary TR2-B windings, and the fact that they are wound in the same sense. In contrast, a transformation ratio of three is required for this purpose in the solution from FIG. 3. Apart from this, the other function of the variant in FIG. 4 corresponds to that function which has already been described in the explanation relating to FIG. 3. Further advantages over the solution from FIG. 3 are a lower parasitic inductance and lower losses, as well as a lower winding capacitance. Owing to the lower winding capacitance, voltage pulses with steeper pulse flanks are possible, which is advantageous for efficient operation of radiators with a discharge which is operated in a pulsed manner and is impeded dielectrically.

Figure 5:
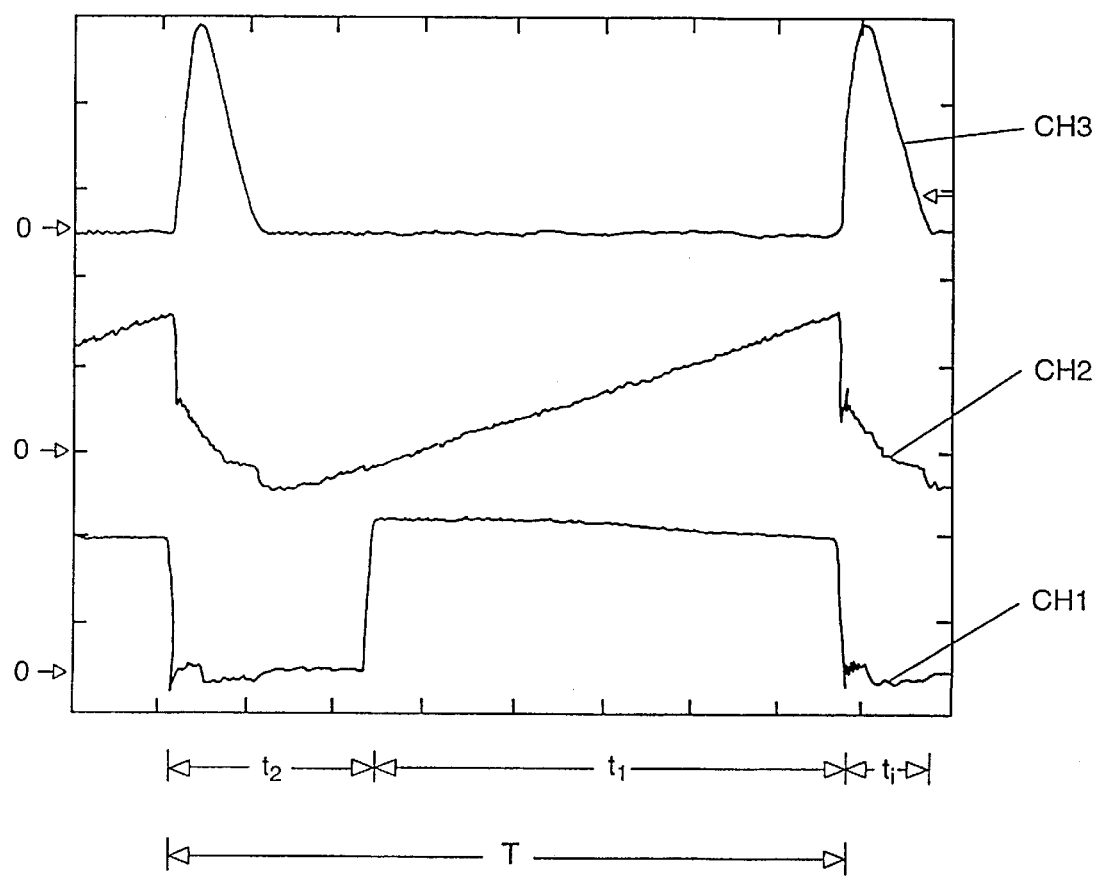
FIG. 5 shows measured value curves relating to the time response of the circuit from FIG. 4.

FIG. 5 shows measurement curves for the drive signal for the transistor T1 (CH1) of the current through the primary winding TR2-A (CH2) and the voltage on the lamp La1 (CH3). The time t (one unit corresponds to 2 $\mu$s) is plotted on the x-axis, and the respective signal strength is plotted, in arbitrary units, on the y-axis. As can be seen from FIG. 5, the pause time between two voltage pulses can be influenced by the length of the period T of the control signal. It is likewise possible to see from FIG. 5 the requirement that, on the one hand, the duration of the switched-off time $t_2$ of the transistor T1 must be longer than the duration $t_i$ of the voltage pulse since, otherwise, the falling flank of the voltage pulse is cut off. On the other hand, the switched-off time $t_2$ must have ended before the zero crossing of the current through the tuned circuit inductance L1 since, otherwise, interference oscillations will normally occur. The pause duration a between the individual voltage pulses can be influenced by the duration of the switched-on time $t_1$ of the transistor T1. The parameters switched-on time $t_1$ and switched-off time $t_2$ can also be used for dimming a connected radiation source.

Figure 6:
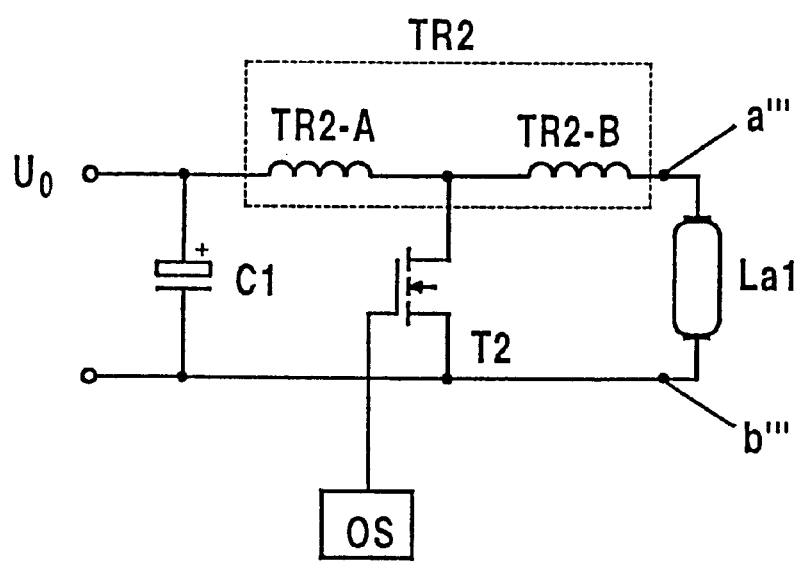
FIG. 6 shows an exemplary embodiment using a MOSFET as the switch.

FIG. 6 illustrates schematically a variant of the autotransformer circuit from FIG. 4. The tuned circuit capacitor is in this case formed by the intrinsic capacitance of the lamp La1 (not illustrated) or by the lamp capacitance transformed by the autotransformer and, in addition, by the depletion layer capacitance (not illustrated) of the MOSFET T2. A supplementary tuned circuit capacitance in the form of a discrete capacitor, for example as in FIG. 4, is dispensed with here. In addition, a discrete freewheeling diode is dispensed with since its task is carried out by the diode inherent in the MOSFET T2 (not illustrated). The rest of the circuit and the principle of the method of operation correspond to those in FIG. 4. The lamp La1 is in consequence connected by means of the connections a", b" in parallel with the series circuit formed by the secondary winding TR2-B and the MOSFET T2. This circuit variant thus manages with an extremely small number of components.

What is claimed is:

1. Electrical circuit arrangement for producing a pulsed voltage for operation of a discharge lamp with electrodes, at least one of which is impeded dielectrically, the circuit arrangement comprising:
    a tuned-circuit inductance;
    a controlled switch which is connected in series with the tuned circuit inductance;
    a pulse generator which alternately drives the switch opened and closed;
    an electrical valve which is connected in parallel with the switch;
    a tuned circuit capacitance which is connected in parallel with the switch; and
    means for coupling the circuit arrangement to the electrodes in such a manner that the circuit arrangement produces a sequence of voltage pulses separated by pause times between the electrodes.

2. Circuit arrangement according to claim 1, wherein the value of the tuned circuit inductance is in the range between about 500 $\mu$H and 10 mH.

3. Circuit arrangement according to claim 1, wherein at least a portion of the tuned circuit capacitance is produced by the capacitance that is intrinsic in discharge lamp which is connected to the means for coupling.

4. Circuit arrangement according to claim 1, wherein the means for coupling comprises a secondary winding of a transformer as well as two connections which are each connected to one pole of the secondary winding, a primary winding of the transformer acting as the tuned circuit inductance.

5. Circuit arrangement according to claim 1, wherein the pulse generator is a square-wave generator integrated circuit.

6. Lighting system comprising:
    a radiation source suitable for a discharge which is impeded dielectrically,
    a pulsed-voltage source which is suitable for supplying voltage pulses which are separated from one another in operation by pauses,
    an at least partially transparent discharge vessel, which is closed and filled with a gas filling or is open and has a gas or a gas mixture flowing through it and is composed of electrically non-conductive material, and
    electrodes which are connected to the pulsed-voltage source, at least the electrodes of one polarity being isolated from the interior of the discharge vessel by dielectric material,
    wherein the pulsed-voltage source has a circuit arrangement having the features of claim 1.

7. Circuit arrangement according to claim 1, wherein the means for coupling comprises two connections which are each connected to one pole of the switch.

8. Circuit arrangement according to claim 7, wherein the means for coupling additionally comprises a secondary winding of an autotransformer which secondary winding is connected between a first pole of the switch and a corresponding connection to the discharge lamp, a primary winding of the autotransformer acting as the tuned circuit inductance.

9. Circuit arrangement according to claim 1, further comprising a buffer and feedback capacitor connected in parallel with the series circuit formed by the tuned circuit inductance and the switch.

10. Circuit arrangement according to claim 9, wherein a capacitance of the buffer and feedback capacitor is greater than a value of the tuned circuit capacitance.

11. Circuit arrangement according to claim 1, wherein the value of the tuned circuit capacitance is in the range between about 100 pF and 1 $\mu$F.

12. Circuit arrangement according to claim 11, wherein the value of the tuned circuit inductance is in the range between about 500 $\mu$H and 10 mH.

13. Circuit arrangement according to claim 11, wherein at least a portion of the tuned circuit capacitance is produced by the capacitance that is intrinsic in discharge lamp which is connected to the means for coupling.

14. Circuit arrangement according to claim 11, wherein the controlled switch is a transistor.

15. Circuit arrangement according to claim 1, wherein the controlled switch is a transistor.

16. Circuit arrangement according to claim 15, wherein the transistor is a MOSFET.

17. Circuit arrangement according to claim 16, wherein at least a portion of the tuned circuit capacitance is provided by a depletion layer capacitance of the MOSFET.

18. Circuit arrangement according to claim 16, wherein the electrical valve is a diode.

19. Circuit arrangement according to claim 18, wherein the diode is provided by a source-drain diode which is integrated in the MOSFET.

20. Method of producing a sequence of essentially half-sinusoidal voltage pulses in the same phase at electrode supply leads of a discharge lamp having electrodes which are impeded dielectrically, with the aid of a circuit arrangement with an energy supply source (1), an inductive energy reservoir (3) coupled to the energy supply source (1), a controllable switch (2) connected to the inductive energy reservoir (3), a signal transmitter (7) driving the controllable switch (2), a capacitive energy reservoir (4) connected to the controllable switch (2), and a voltage-controlled electric valve (6) connected to the controllable switch (2), the method comprising the steps of:

charging the inductive energy reservoir (3) with the aid of the energy supply source (1) by closing the switch (2), terminating the charge-up phase and transmitting the magnetic energy stored in the inductive energy reservoir (3) to the capacitive energy reservoir (4) by opening the switch (2), as a result of which a first voltage half-cycle of a roughly sinusoidal oscillation is produced on the inductive energy reservoir (3), while a similar voltage half-cycle, but in antiphase, is produced on the capacitive energy reservoir (4), applying the first voltage half-cycle to the electrode supply leads, feeding back the energy from the capacitive energy reservoir (4), via the inductive energy reservoir (3), into the energy supply source (1), while the voltage on the capacitive energy reservoir (4) is clamped to the voltage which is dropped across the open electrical valve (6), and cyclically repeating the above method steps after a time determined by the signal transmitter (7).

* * * * *